Sept. 12, 1933.  E. V. SCHAAL  1,926,688

HORN

Filed Feb. 23, 1932

INVENTOR

BY *Earl V. Schaal,*

*Bean & Brooks* ATTORNEY

Patented Sept. 12, 1933

1,926,688

UNITED STATES PATENT OFFICE 1,926,688

HORN

Earl V. Schaal, East Aurora, N. Y., assignor to Trico Products Corporation, Buffalo, N. Y.

Application February 23, 1932. Serial No. 594,663

8 Claims. (Cl. 116—137)

This invention relates to horns and similar instruments, having particular relation to sound devices of this character used on automobiles, boats and like vehicles.

Such devices conventionally comprise elongated trumpets having sound creating means at one end thereof and being open at their opposite ends. The trumpets are sometimes mounted on the exterior of the vehicle with the open ends thereof directed forwardly, so that the warning signal or sound note may project forwardly of the vehicle into the path of traffic ahead. Accordingly, rain, snow and other foreign matter may be forced against the horn by the forward movement of the vehicle and if allowed to enter the horn trumpet may interfere with its operation and sometimes may damage the sound creating elements. To overcome these difficulties, it is usual to insert a wire screen in the trumpet passage, spaced from the open end of the trumpet, and of sufficiently small mesh to prevent foreign matter from ordinarily reaching the sound creating mechanism. It has been found, however, that foreign matter, particularly ice and snow will collect on such a screen particularly if it be of fine mesh, effecting a material reduction in the volume of the sound impulses, emitted from the trumpet. The restricted openings of the fine mesh screens have also been found to somewhat impair the volume of sound produced by the horn.

The present invention comprehends a grille-like cover for disposition over the mouth of the trumpet and having openings therethrough which are sufficiently large to permit the ready passage of sound waves and so positioned as to prevent the ingress of foreign matter. The invention further provides a screen adapted to be held in place over the mouth of the trumpet by the grille-like cover, to further prevent the entrance of foreign matter into the horn. By reason of the protection afforded by the cover, the screen may be of comparatively large mesh and will thus not interfere with the operation of the device.

Figure 1:
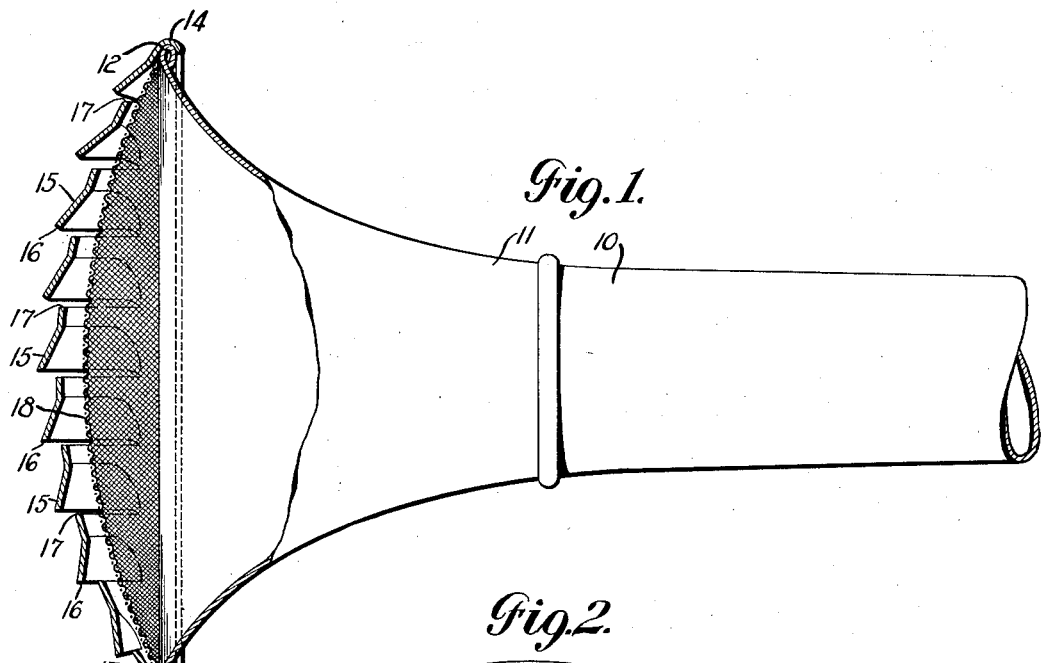
Figure 2:
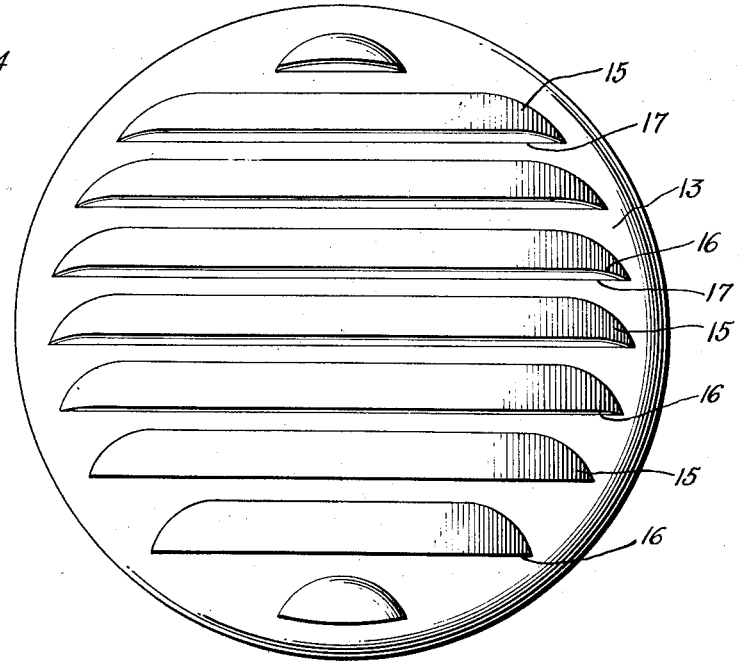

These and other objects and advantages including those arising from the formation, arrangement, and manner of assembly of the parts, will become apparent from the following description of one typical embodiment of the invention, shown in the accompanying drawing, wherein:

Fig. 1 is a side elevation of the front part of a trumpet, portions thereof being broken away to show parts of the device in vertical section; and, Fig. 2 is a front elevation of the device shown in Fig. 1.

As illustrated, the tubular horn trumpet 10 may terminate in a flared or bell part 11, the periphery 12 of which may be return bent to provide an annular bead. The cover 13 may comprise a convex plate or sheet of metal, conforming in outline to the open end 11 of the trumpet, and having at its periphery a rearwardly and thence inwardly projected flange 13, the internal diameter of the inturned portion of the flange being slightly less than the overall diameter of the beaded periphery 12 of the bell.

A plurality of louvers 15 are struck out from the body of the plate 12 and preferably incline forwardly and downwardly in order to efficiently deflect falling now, rain and the like. Lower portions 16 of the louvers are preferably spaced but slightly from the upper portions 17 of subadjacent louvers in a vertical plane, and are spaced a considerable distance therefrom in a horizontal plane in order to provide sound openings of substantial area.

Disposed between the cover 13 and the beads 12 at the forward part of the trumpet is a screen 18 of comparatively large mesh. The screen may be of slightly convexed or dished formation and preferably is of approximately the same diameter as the peripheral bead 12 of the trumpet so that, to be inserted into the cover, it must be flexed.

The screen may be assembled with the cover or grille 13 before the latter is attached to the trumpet, and because of the resilience of the wire screen, after being bowed or convexed the periphery of the screen will expand and engage between cover plate 13 and the inturned flange 14, preventing the screen from becoming displaced from the cover accidentally.

In attaching the cover or grille to the trumpet, the flange 14 is flexed radially to snap over the bead 12. The resilience of the metal comprising the cover, or trumpet, or both, will effectively prevent accidental detachment of the cover, although the latter may be pried off to facilitate cleaning of it or of the trumpet interior.

It will be understood that the bulk of rain or like foreign matter driven against the cover will be deflected by the louvers 15 and that the force of any such matter which should enter the openings between the louvers will be materially reduced so that, upon impact with the screen 18, is may fall downwardly through the openings provided by lower louvers rather than becoming caked against, or being forced through the mesh openings of the screen.

It will further be understood that the invention may be applied to all types of instruments having trumpets, or equivalent parts. Especial value attaches to the use of the invention in connection with instruments operated by a moving column of air, such as conventional suction or air pressure types of horns, since, in such instruments, it is imperative that air pass through the trumpet passage, for, if the air passage be blocked or restricted, such instrument may fail to function in a proper manner.

It will still further be understood that the invention may be utilized to great advantage in different structural embodiments and arrangements than those shown and described herein, the latter being merely illustrative of the inventive principles involved.

I claim:

1. In a horn, a trumpet having a bell part with a beaded periphery, a convex guard part extending across the mouth of the bell and having a return bent peripheral flange engaged over the beaded periphery of the bell part, said guard having a plurality of struck-out horizontal louvers exending forwardly and downwardly, and and a convex wire screen retained within the flange of the cover part and between the cover part and the bell part, one of said parts being resilient to permit the flange of the guard to be snapped over the beaded periphery of the bell part.

2. In a horn, a trumpet having a bell part with a beaded periphery, a convex guard part extending across the mouth of the bell part and having a return bent peripheral flange engaged over the beaded periphery of the bell part, said guard having a plurality of struck-out horizontal louvers extending forwardly and downwardly, and a convex wire screen retained within the flange of the cover part and between the latter and the bell part.

3. In a horn, a trumpet including a bell having a beaded periphery at its mouth, a guard extending across said mouth and having a flange engaged over said beaded periphery to retain said guard, said guard having a plurality of louvers therein for providing shielded openings, and a wire screen disposed between the bell and guard.

4. In a horn, a trumpet having a beaded periphery at its mouth, a guard extending across said mouth and having a flange engaged over the peripheral bead to retain said guard, and said guard having a plurality of louvers therein for providing shielded sound openings.

5. In a horn, an elongated tubular trumpet increasing in diameter from one end to the mouth at the other end thereof, a protective closure extending across said mouth, said closure having a plurality of downwardly deflected louvers therein for providing shielded sound openings.

6. In a sound signal device, a trumpet including a bell member having an open mouth, a guard member extending across said mouth and having a plurality of sound-emitting openings therein, a screen extending over said mouth and disposed adjacent the inner face of the guard member, one of said members having a peripheral flange providing a recess for receiving the peripheral portion of the other member, whereby a snap-on connection is provided between the guard member and trumpet.

7. In a sound signal device, a member having a beaded periphery about an open mouth, a convex guard extending across said mouth and having a return bent peripheral flange for snapping over the beaded periphery of said member, and said guard having a plurality of downwardly deflected louvers therein for providing shielded sound openings.

8. In a sound signal device, a member having a beaded periphery about an open mouth, a guard extending across said mouth and having a return bent peripheral flange for snapping over the beaded periphery of said member, and said guard having a plurality of sound emitting openings therein.

EARL V. SCHAAL.